(12) United States Patent
Roukos et al.

(10) Patent No.: US 11,515,916 B2
(45) Date of Patent: Nov. 29, 2022

(54) AXIALLY SYMMETRIC HIGH-DENSITY BEAMFORMING TOPOLOGY

(71) Applicant: The Boeing Company, Chicago, IL (US)

(72) Inventors: Daniel Steven Roukos, Hermosa Beach, CA (US); Siddhartha Ghosh, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/559,489

(22) Filed: Dec. 22, 2021

(65) Prior Publication Data

US 2022/0216903 A1    Jul. 7, 2022

Related U.S. Application Data

(60) Provisional application No. 63/134,081, filed on Jan. 5, 2021.

(51) Int. Cl.
*H04B 7/02* (2018.01)
*H04B 7/06* (2006.01)
*H01Q 3/38* (2006.01)

(52) U.S. Cl.
CPC ............. *H04B 7/0617* (2013.01); *H01Q 3/38* (2013.01)

(58) Field of Classification Search
CPC ................................ H04B 7/0617; H01Q 3/38
USPC ........ 375/267, 261, 260, 259, 219, 316, 295
See application file for complete search history.

(56) References Cited

U.S. PATENT DOCUMENTS

2005/0110681 A1* 5/2005 Londre ................. H01Q 1/246
343/700 MS

* cited by examiner

*Primary Examiner* — Zewdu A Kassa
(74) *Attorney, Agent, or Firm* — Jordan IP Law, LLC

(57) ABSTRACT

Systems, methods, and methods of fabricating can provide an axially symmetric high-density beamforming architecture. The beamforming architecture can include pluralities of symmetric beamforming layers having integrated electronics. The beamforming layers can be incrementally rotated and stacked with respect to each other in three-dimensions (3D) to provide a high-density topology capable of forming thousands of beams in a phased array antenna. The beamforming layers provide signal/beam pathways from a group (or sub-group) of signal interfaces on an input side of the beamforming layer to a corresponding group of signal interfaces on an output side of the beamforming layer. The beamforming architecture can also include a plurality of beam routing layers that mate with the plurality of beamforming layers to route the signals from a plurality of input beamforming layers to a plurality of output beamforming layers.

20 Claims, 5 Drawing Sheets

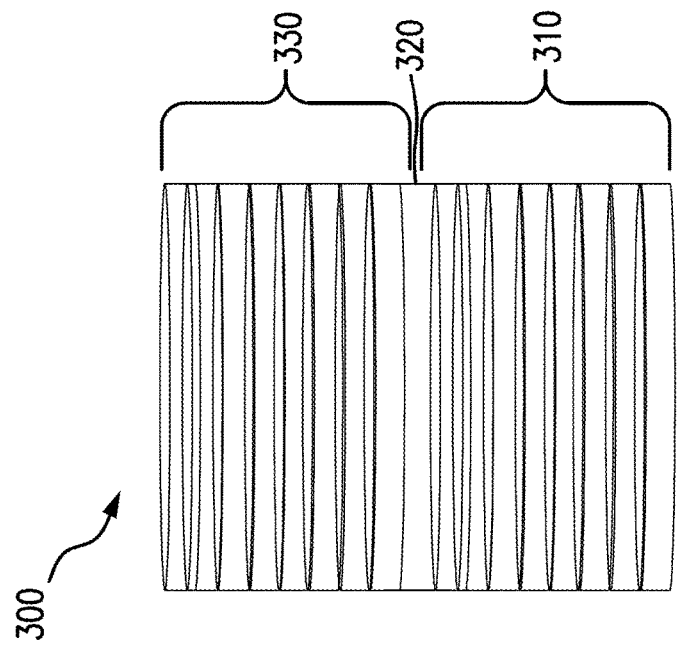
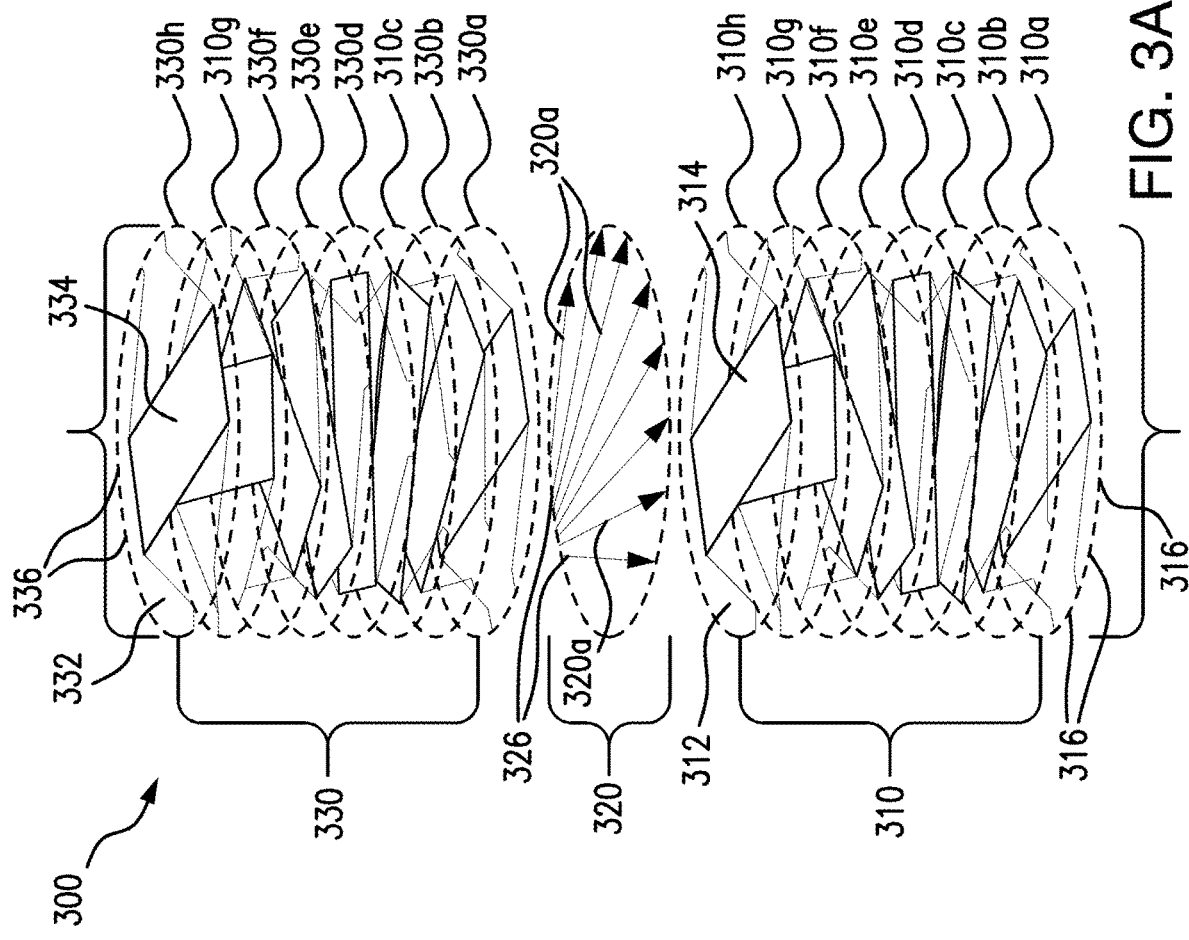

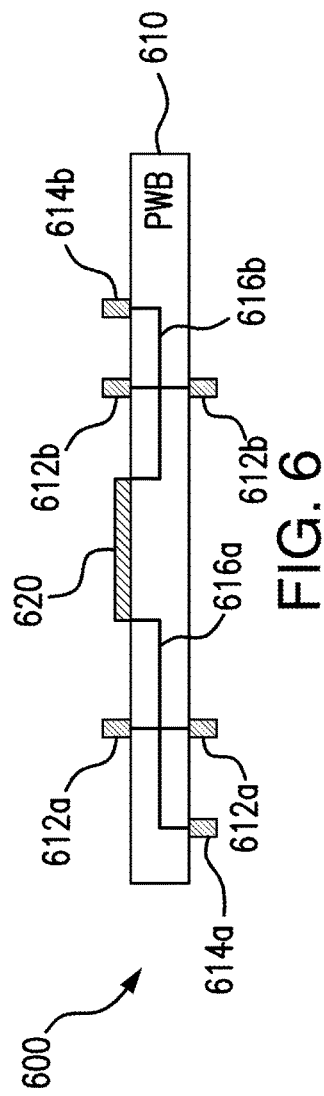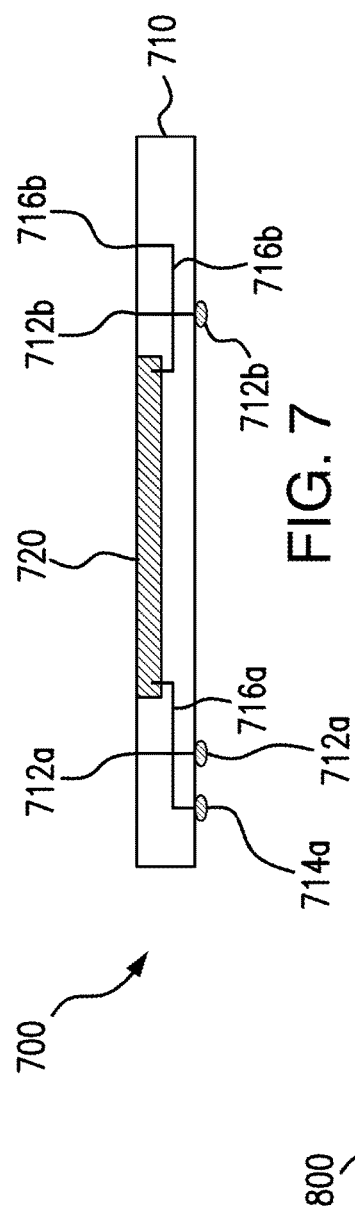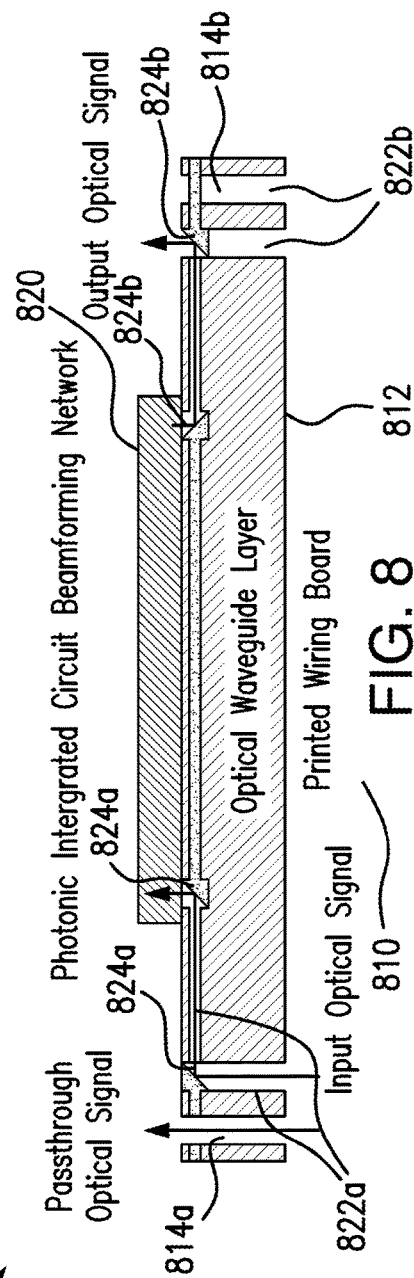

AXIALLY SYMMETRIC HIGH-DENSITY BEAMFORMING TOPOLOGY

CROSS-REFERENCE TO RELATED APPLICATIONS

This U.S. Non-provisional patent application claims the benefit of priority to U.S. Provisional Patent Application No. 63/134,081 filed Jan. 5, 2021.

TECHNICAL FIELD

Examples generally relate to signal beamforming. More particularly, examples relate to axially symmetric high-density beamforming topologies for phased array antennas. Examples can also relate to one or more methods for fabricating one or more high-density beamforming structures.

BACKGROUND

Spatial filtering or beamforming is a signal processing technique for use in sensor array applications that offers the benefit of directional signal transmission and reception. Beamforming can be achieved by combining elements in an antenna array in a certain configuration such that signals at particular angles in the array experience constructive interference while other signals in the array experience destructive experience. Using beamforming as both a transmitter and a receiver can provide spatial selectivity. This directivity of the array can provide a substantial improvement over omnidirectional transmission and reception. Beamforming can be used for radio and sound waves. As a result, beamforming is well-suited for a wide range of applications including, for example, wireless communications, acoustics, radar, sonar, seismology, astronomy, biomedicine, and the like.

Traditional phased array beamforming networks typically include of one or more elements (e.g., N elements) that form one or more beams (e.g., B beams). One or more splitters can receive a signal from each element and divide the signal one or more times (e.g., B times). Each copy of the signal can then be shifted in phase and amplitude and summed with one or more copies (e.g., N copies) of a signal from each of the elements in the array. There can be a plurality of summing networks that form the final B beams. Traditional phased array beamforming networks can be built in both "brick" and "tile" architectures. In brick architectures, rows of elements are typically built into a plurality of separate printed wiring board (PWB) structures that are stacked vertically (forming a full stack of vertical cards). A plurality of horizontal PWB cards can then edge interface across the full stack of vertical cards to provide the required interfacing across the elements to form the beams. In tile arrays, all of the beamforming electronics exist within a single unit cell containing one element of the array. Signals can then be summed in planar combining networks that typically reside underneath the elements on the same PWB. Brick arrays typically have more room to package the array electronics and can typically enable more beams to be formed. Brick arrays, however, require many boards to interface across large assemblies. While tile arrays often form fewer beams since all of the electronics must be packaged within the unit cell, this typically results in a more highly integrated assembly with fewer parts.

Further, analog phased arrays utilize radio frequency (RF) devices such as splitters, phase shifters and amplifiers to perform the necessary beamforming operations. However, a beamforming pathway is required for each element and beam combination—resulting in a high beamforming pathway requirement. As a result, analog arrays typically become impractical and/or excessively expensive when a high number of elements and beams are required (e.g., more than 1000 elements and more than 10 beams). In contrast, digital arrays can form an arbitrarily large number of beams without scaling hardware complexity. This can be accomplished by digitizing the RF signals at each element and utilizing digital signal processing to form the beams. While digital arrays can be used to form thousands of beams they require implementation of digital converters at each element which can be costly in DC power especially at wider bandwidths.

Further still, the introduction of RF photonics in phased array architectures has enabled phased arrays to lower beamforming power requirements, enhance bandwidth, utilize frequency agnostic components, and reduce electromagnetic interference/electromagnetic compatibility (EMI/EMC) related issues. Photonic links can also provide a higher dynamic range and a higher effective number of bits (ENOB). Integrated circuits (ICs) having integrated photonics can enable the monolithic incorporation of electronic and photonic components in photonics-based phased array architectures. However, as the number of elements in the phased array increases, the complexity of optical and electrical interconnections and routing becomes significantly challenging.

BRIEF SUMMARY

In accordance with one or more examples, an axially symmetric high-density beamforming architecture is disclosed. The beamforming architecture is rotationally stacked to provide a high-density three-dimensional (3D) circuit that forms thousands of beams or signals in a phased array antenna. The beamforming architecture can include a plurality of identical beamforming layers or disks having beamforming electronics and signal interfaces disposed around the beamforming electronics near a perimeter of the beamforming layer. By stacking the layers at incremental degrees of rotation, the beamforming architecture can enable a very high number of beamforming pathways.

In accordance with one or more examples, an axially symmetric high-density beamforming assembly includes a plurality of beamforming layers (e.g., printed wiring boards (PWBs), optical waveguide layers, and the like) having a plurality of signal interfaces symmetrically disposed proximate a perimeter of the layers. The signal interfaces can include signal inputs and outputs in communication with the beamforming electronics to form one or more beamforming pathways. The signal interfaces can also include pass throughs or vias that allow a signal to pass perpendicularly from one side of a beamforming layer (e.g., a bottom) to the other side of the beamforming layer (e.g., a top) without communicating with the beamforming electronics of that particular beamforming layer.

In accordance with one or more examples, the axially symmetric high-density beamforming assembly includes a plurality of beamforming layers having a plurality of signal interfaces symmetrically disposed around the perimeter that enable thousands of signal pathways by stacking the layers at incremental degrees of rotation. The plurality of beamforming layers can be connected, coupled, mated and/or in communication with each other by the plurality of signal interfaces. The axially symmetric high-density beamforming assembly can also include a beam routing layer that routes beams or signals from a sub-group of signal interfaces on an input side of a beamforming layer and distribute the beams or signals to signal interfaces on an output side of the beamforming layers.

In one example, a high-density beamforming assembly for phased array antennas, the assembly including a first plurality of beamforming layers, wherein each beamforming layer has an identical structure and includes a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and, a beamforming circuit disposed on the beamforming layer, wherein the beamforming circuit is in communication with one or more of the n-beamforming inputs and one or more of the n-beamforming outputs to form a beamforming sub-array, and wherein the first plurality of beamforming layers are to be axially symmetric, progressively rotated and stacked such that the plurality of beamforming interface elements correspond to and communicate with a plurality of beamforming elements on an adjacent beamforming layer to form a plurality of beamforming sub-array groups. The assembly also includes a beam routing layer disposed on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

In another example, a high-density beamforming method for phased array antennas includes providing a first plurality of beamforming layers, wherein each beamforming layer has an identical structure and includes a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and, a beamforming circuit disposed on the beamforming layer, wherein the beamforming circuit is in communication with the n-beamforming inputs and the n-beamforming outputs to form a beamforming sub-array, and wherein the first plurality of beamforming layers are to be axially symmetric, progressively rotated and stacked such that the plurality of beamforming interface elements correspond and communicate with respect to a plurality of beamforming elements on an adjacent beamforming layer to form a plurality of beamforming sub-array groups.

The method further includes providing a beam routing layer on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

In yet another example, a method for fabricating a high-density beamforming structure including providing a first plurality of axially symmetric beamforming structures, wherein each beamforming structure includes a plurality of beamforming inputs, a beamforming circuit, a plurality of beamforming outputs, and a plurality of pass through vias that form one or more beamforming sub-arrays; successively stacking and incrementally rotating each of the plurality of axially symmetric beamforming structures to form a first high-density beamforming stack, wherein the high-density beamforming stack forms a beamforming array group; and, disposing a beam routing layer on the first high-density beamforming stack, wherein the beam routing layer includes a plurality of signal interconnects that correspond to and communicate with one or more of the plurality of beamforming structures on an adjacent beamforming layer, and wherein the beam routing layer is to route and distribute the beamforming inputs from an input side of the beam routing layer to a plurality of signal interconnects on an output side of the beam routing layer.

Accordingly, examples of the high-density beamforming assemblies, systems, structures, architectures, and methods disclosed herein can provide the ability to construct very large beamforming networks that can be packaged densely. As a result, construction of arbitrarily large networks can be formed using only two structures that are repeated instead of many unique structures. Consequently, a large amount of interfacing can be enabled in a simple manner. In examples, the high-density beamforming assemblies, systems, structures, architectures, and methods disclosed herein can also provide a means to create large networks with electro-optical structures and photonic ICs.

The features, functions, and advantages that have been discussed can be achieved independently in various examples or can be combined in yet other examples further details of which can be seen with reference to the following description and drawings.

DRAWINGS

The various advantages of the examples of the present disclosure will become apparent to one skilled in the art by reading the following specification and appended claims, and by referencing the following drawings, in which:

FIG. 3A is an exploded view of an axially symmetric beamforming assembly including components according to examples as shown in FIGS. 1A, 1B and 2.

FIG. 3B is a side view of the axially symmetric beamforming assembly according to the example as shown in FIG. 3A.

FIG. 6 illustrates an implementation of a beamforming layer according to an example.

FIG. 7 illustrates an implementation of a beamforming layer according to another example.

FIG. 8 illustrates an implementation of a beamforming layer according to yet another example.

DESCRIPTION

Figure 1A:
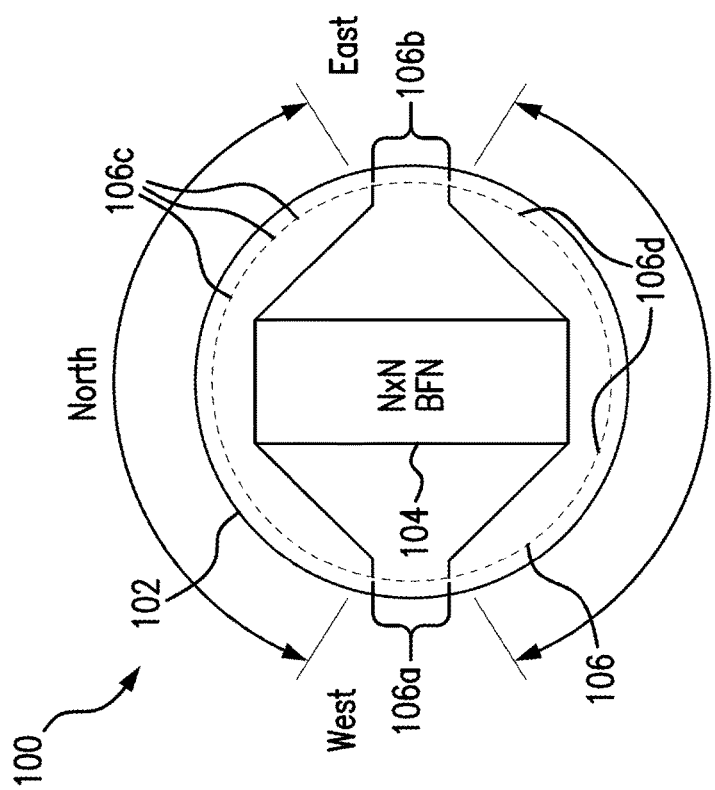
FIG. 1A is a top view of an axially symmetric beamforming layer according to an example.
Figure 1B:
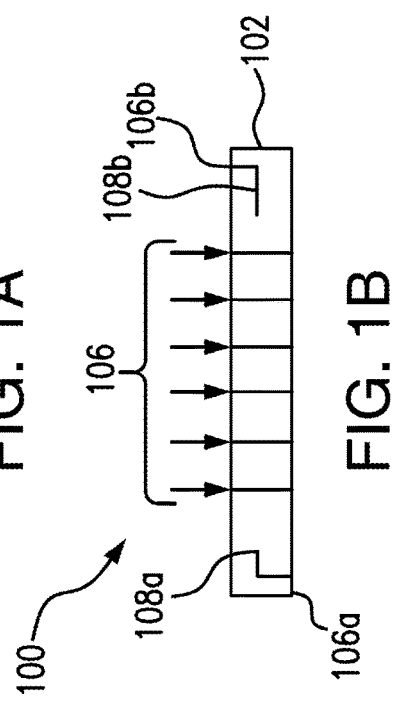
FIG. 1B is a side view of an axially symmetric beamforming layer according to an example.

Turning now to FIGS. 1A-1B, in accordance with one or more examples, a beamforming layer 100 is shown. To facilitate discussion, FIG. 1A has been labeled with orientation markers "north", "south", "east" and "west". The beamforming layer 100 includes a circularly formed, planar structure or layer 102 having beamforming electronics 104 and a plurality of signal interfaces 106 symmetrically arranged in a circle around the beamforming electronics 104. The layer 102 can be a printed wiring board (PWB) or similar structure such as an interposer, a printed circuit board (PCB), etched wiring board, printed circuit assembly (PCA), printed circuit board (PCB) assembly or PCBA, and other similar structures, and can be formed of an insulating material. The beamforming electronics 104 can be arranged substantially in the middle of and substantially co-planar with the layer 102. The beamforming electronics 104 can be, for example, an N×N beamformer that receives input signals from N elements (not shown) and forms N beams. The size of N is arbitrary and is typically selected as a power of 2 (e.g., 2, 4, 8, etc.). N elements, as discussed herein, can refer to analog inputs such as RF inputs. The beamforming electronics 104 provides a self-contained package having all the necessary components and capabilities to process the input signals received from N elements, and to form and output corresponding beams. In examples, the beamforming electronics 104 include signal splitters, phase/amplitude shifters, and combiners.

The layer 102 can be substantially divided into two (2) hemispheres or semi-circles shown here as a north side and a south side. The layer 102 includes a plurality of signal interfaces 106 that provide signal inputs (e.g., 106a), signal outputs (e.g., 106b), and signal pass throughs or vias (e.g., 106c, 106d) that are symmetrically spaced around a perimeter of the layer 102 and divided into four (4) groups 106a, 106b, 106c and 106d. The signal interfaces 106a and 106b are in communication with beamforming electronics 104 to form a beamforming sub-array. For example, signal interface 106a can correspond to a plurality of input signals received from N elements. Signal interfaces 106b can correspond to a plurality of beam outputs on an opposite side of the layer 102 from the signal interfaces 106a. The remaining signal interfaces 106c, 106d provide pass throughs or vias that allow input signals to pass perpendicularly through the beamforming layer 102 without being routed to or processed by the beamforming electronics 104. As illustrated in FIG. 1A, a group of pass throughs 106c are arranged on the north side of the layer 102 and a group of pass throughs 106d are arranged on the south side of the layer 102.

In an example, a group of N signal interfaces 106a receives and routes the input signals from a first (i.e., west) side of the layer 102 to a corresponding group of N signal interfaces 106b on an opposite (i.e., east) side of the layer 102. As illustrated, the signal interfaces 106a on the input (i.e., west) side of the layer 102 route signal inputs from N elements on the bottom of layer 102 to the beamforming electronics 104 along signal traces (or tracks) 108a. Signal traces 108b on the output (i.e., east) side of the layer 102 route output beams from the beamforming electronics 104 to the signal interfaces 106b on the top of the output side of the layer 102. In other examples, the signal traces 108a, 108b can be formed of a conductive material (e.g., copper) to provide pathways for electrical signals and/or beams. In yet other examples, the signal traces can be replaced by an optical waveguide formed in a layer of glass, crystal, or similar material to provide an optical or photonic waveguide. The remaining signal interfaces 106c and 106d on the north and south, respectively, form signal pass throughs or vias that allow a signal to pass perpendicularly from one side of the beamforming layer 102 (e.g., a bottom) to the other side of the beamforming layer 102 (e.g., a top) without communicating with the beamforming electronics 104 of that particular beamforming layer. As a result, the beamforming layer 102 (i.e., each beamforming layer) can receive a plurality of input signals of a predetermined size from N elements (e.g., 4 or 8 input signals) as an input sub-group at signal interfaces 106a, route the signals to beamforming electronics 104, and output the resulting beams from the beamforming electronics 104 to a corresponding plurality of signal interfaces 106b on the opposite side of the layer 102.

As discussed below with respect to FIG. 3A-3B, a plurality of beamforming layers 100 can be axially stacked on top of each other to be connected, coupled, mated and/or in communication with each other by means of the plurality of signal interfaces 106 (i.e., 106a, 106b, 106c and 106d) due to the beamforming layers 100 having identical configurations. The disclosed configuration thereby enables a plurality of beamforming layers 100 that each process a discrete signal sub-group to be successively stacked and incrementally rotated by a measure of the size of the sub-groups. Based on this configuration, a plurality of beamforming layers 100 (e.g., a plurality of stacked beamforming layers) can process a full signal array.

Figure 2:
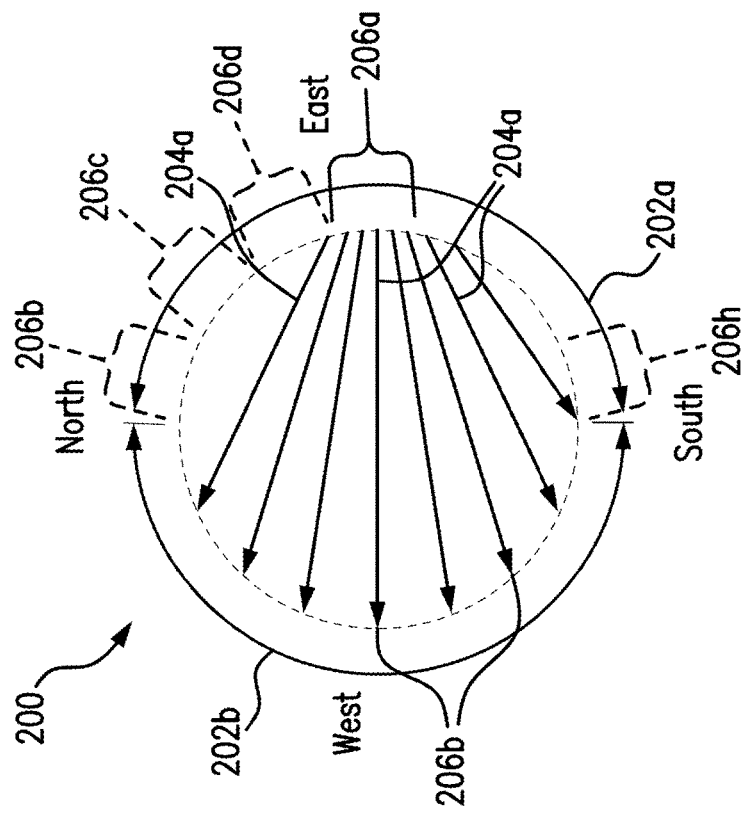
FIG. 2 is a top view of an axially symmetric beam routing layer according to an example.

Referring to FIG. 2, in accordance with one or more examples, a beam routing layer 200 is shown. To facilitate discussion, FIG. 2 has been labeled with orientation markers "north", "south", "east" and "west" that correspond with the orientation marks in FIG. 1A. The beam routing layer 200 includes an interconnect layer 202 and a plurality of signal interconnects 206 symmetrically arranged in a circle proximate a perimeter of the interconnect layer 202. The interconnect layer 202 is a circularly formed planar structure formed of an insulating material. The interconnect layer 202 can be divided into two hemispheres or semi-circles including input semi-circle 202a and output semi-circle 202b. The interconnect layer 202 also includes a plurality of beam routing pathways or beam routing channels 204 that provide paths or channels that route signals from signal interconnects 206 associated with an input sub-group (e.g., input sub-group 206a shown here) on one side (i.e., an input semi-circle 202a) of the interconnect layer 202 to specified signal interconnects 206b on an opposite side (i.e., an output semi-circle 202b) of the interconnect layer 202. As a result, the beam routing layer 200 acts to route signals from an input semi-circle 202a on an input side of the interconnect layer 202 to an output semi-circle 202b on an output side of the interconnect layer 202.

The routing channels 204 can be arranged in a plurality of routing channel groups (e.g., 204a, 204b, 204c, . . . 204n) as appropriate so that each routing channel (204a-204n) corresponds with and routes signals associated with a specific input sub-group (206a-206n). The beam routing layer 200 should be substantially the same size (i.e., diameter) as the beamforming layers 100, and the signal interconnects 206 should be symmetrically spaced at substantially the same diameter and degree of separation as the signal interfaces 106. Accordingly, the beamforming layer 100 and beam routing layer 200 can be stacked such that signal interfaces 106 and signal interconnects 206 are substantially aligned and in communication. In this manner, signals output from beamforming layer 100 (e.g., at signal interfaces 106b), as shown in FIG. 1, can be received by the beam routing layer 200 at signal interconnects 206 (e.g., input sub-group 206a), and routed via the routing channels 204 (e.g., routing channel 204a) from input sub-group 206a on the input semi-circle 202a and distributed to corresponding signal interconnects 206 (e.g., output sub-group 206b) on the output semi-circle 202b. The beamforming layer 100 including signal interfaces 106 and the beam routing layer including signal interconnects 206 can be selected and arranged in a variety of configurations to be symmetrical in size, diameter, number, distribution, degree of separation, and the like. The symmetrical configuration of the signal interfaces 106 and signal interconnects 206 also allows the components to be used in stacks or layers, thereby allowing the components to be used as "building blocks" to develop beamforming assemblies of varying sizes. As a result, the components enable beamforming to be performed on a wide range of signal sizes for use in a wide range of applications.

As illustrated in FIG. 3A-3B, a high-density beamforming assembly 300 is shown in accordance with one or more examples. FIG. 3A shows an exploded view of the high-density beamforming assembly 300. The high-density beamforming assembly 300 includes a first plurality of beamforming layers 310, a beam routing layer 320, and a second plurality of beamforming layers 330. FIG. 3B shows a side view of the high-density beamforming assembly 300 including a first plurality of beamforming layers 310 that provide an input sub-array group, a beam routing layer 320, and a second plurality of beamforming layers 330 that provide an output sub-array group. The first plurality of beamforming layers 310 (i.e., 310a-310h) and the second plurality of beamforming layers 330 (i.e., 330a-330h) include materials and a configuration consistent with beamforming layer 100, discussed in more detail above with respect to FIG. 1A-B. More particularly, each of the first plurality of beamforming layers 310 includes a circularly formed, planar structure or layer 312 having beamforming electronics 314 and a plurality of signal interfaces 316 symmetrically arranged in a circle around the beamforming electronics 314. The first plurality of beamforming layers 310 including the signal interfaces 316 are axially symmetric. Each of the first plurality of beamforming layers 310 are progressively rotated and stacked such that the signal interfaces 316 correspond to and communicate with respect to signal interfaces 316 on an adjacent beamforming layer 310 (i.e., 310a corresponds to and communicates with 310b, 310b corresponds to and communicates with 310c, 310c corresponds to and communicates with 310d, and so on). The result is that each of the first plurality of beamforming layers 310a-310h provides a beamforming sub-array group. The signal interfaces 316 that are not used to process the sub-array group for that particular layer provide pass throughs or vias that allow signals to pass to an adjacent beamforming layer (310a-310h) without being processed. When progressively rotated and stacked, as discussed herein, the first plurality of beamforming layers 310 provide a plurality of beamforming input sub-array groups for processing a full-array beam.

In the same manner as discussed above with respect to the first plurality of beamforming layers 310, each of the second plurality of beamforming layers 330 includes a circularly formed, planar structure or layer 332 having beamforming electronics 334 and a plurality of signal interfaces 336 symmetrically arranged in a circle around the beamforming electronics 334. The second plurality of beamforming layers 330 including the signal interfaces 336 are axially symmetric with each other as well as with the first plurality of beamforming layers 310. Each of the second plurality of beamforming layers 330 are progressively rotated and stacked such that the signal interfaces 336 correspond to and communicate with respect to signal interfaces 336 on an adjacent beamforming layer 330 (i.e., 330a corresponds to and communicates with 330b, 330b corresponds to and communicates with 330c, 330c corresponds to and communicates with 330d, and so on). The result, consistent with the arrangement of the first plurality of beamforming layers 310, is that each beamforming layer 330a-310h provides a beamforming sub-array group. The signal interfaces 336 that are not used to process the sub-array group for that particular layer provide pass throughs or vias that allow signals to pass to an adjacent beamforming layer (330a-330h) without being processed. When progressively rotated and stacked, as discussed herein, the second plurality of beamforming layers 330 form a plurality of beamforming output sub-array groups for processing a full-array beam.

The beam routing layer 320 can include materials and a configuration consistent with the beam routing layer 200, discussed in more detail above with respect to FIG. 2. More particularly, the beam routing layer 320 includes a circularly formed interconnect layer 322 having substantially the same dimensions as the first plurality of beamforming layers 310 and the second plurality of beamforming layers 330. The beam routing layer 320 also includes a plurality of beam routing pathways 320a-320h (320a shown here) that each provide paths or channels that route signals from signal interconnects 326 on one side of the interconnect layer 322 to specified signal interconnects 326 on the opposite side of the interconnect layer 322. The dimensions and configuration of the beam routing layer 320 allows it to be sandwiched between the first plurality of beamforming layers 310 and the second plurality of beamforming layers 330. As a result, the beam routing layer 320 can route signals associated with outputs from each of the first plurality of beamforming layers 310a-310h to inputs associated with of the second plurality of beamforming layers 330.

Each of the first plurality of beam routing layers 310 and the second plurality of beam routing layers 330 can be arranged in S sub-array groups. As a result, N elements can be beamformed into S sub-array groups. In this example, S=8 (i.e., there are 8 beam routing layers 310a-310h). Each of the first plurality of beam routing layers 310 (i.e., 310a-310h) and each of the second plurality of beam routing layers 330 (i.e., 330a-330h) are arranged to have an input semi-circle and an output semi-circle. Inputs to signal interfaces 316 on a first side of the input semi-circle of the first plurality of beam routing layers 310a-310h can be processed by the beamforming electronics 314 (i.e., 314a-314h) and output to signal interfaces 316 on an output side of the first plurality of beam routing layers 310a-310h. The beam routing layer 320, which is stacked on top of the first plurality of beamforming layers 310, receives the signal outputs (i.e., a plurality of signal sub-array groups) from the first plurality of beamforming layers 310 at signal interconnects 326 and routes each of the sub-array groups across the interface layer 322 to corresponding signal interfaces 336 on the second plurality of beamforming layers 330. The second plurality of beamforming layers 330 (i.e., 330a-330h) can then process each of the sub-array groups via beamforming electronics 334 (i.e., 334a-334h) to output the sub-array signal on an output semi-circle side of the corresponding layers 330a-330h. As a result, the full array of the beam can be processed. The arrangement thereby provides a compact and high-density beamforming assembly.

As discussed in greater detail below with respect to FIGS. 6-8, in one or more examples, the first plurality of beamforming layers 310 and the second plurality of beamforming layers 330 can include various beamforming structures to control the plurality of full array beams. These various beamforming structures can include, for example, a printed wiring board (PWB) and digital beamforming electronics, an interposer and a wafer scale beamformer, or an optical waveguide layer and a photonic integrated circuit beamforming network.

Figure 4:
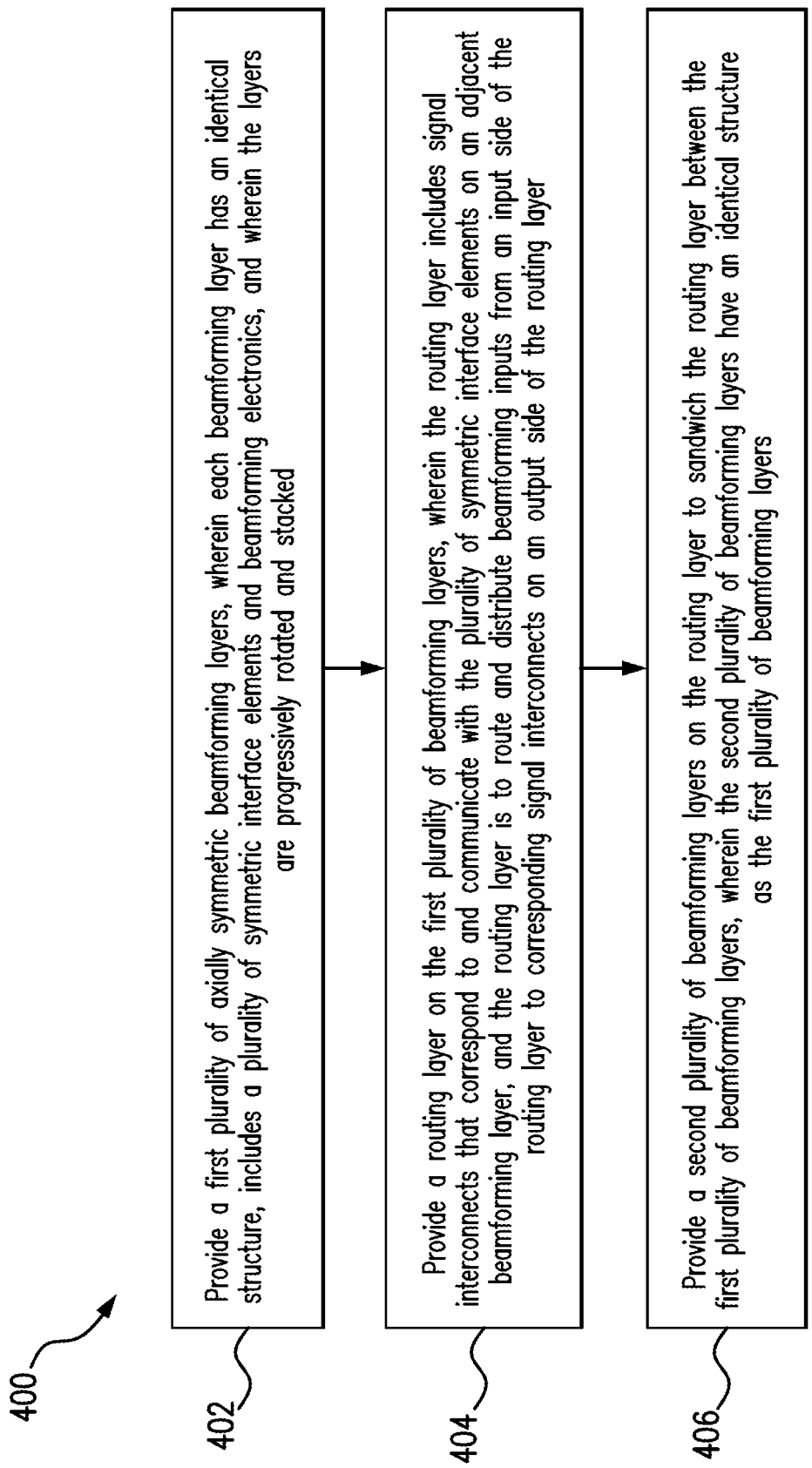
FIG. 4 is a method for high-density beamforming according to an example as shown in FIGS. 3A-3B.

FIG. 4 shows a method 400 for high-density beamforming. The method 400 can be implemented in a system or assembly such as, for example, the high-density beamforming assembly 300 shown in FIGS. 3A-3B. In examples, the aspects of the method 400 can be implemented in logic instructions (e.g., software), configurable logic, fixed-functionality hardware logic, etc., or any combination thereof. Aspects of the method 400 can also be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, statesetting data, configuration data for integrated circuitry, state information that personalizes electronic circuitry and/or other structural components that are native to hardware (e.g., host processor, central processing unit/CPU, microcontroller, etc.).

The illustrated method 400, at block 402, includes providing a first plurality of beamforming layers, wherein each of the beamforming layers are axially symmetric, has an identical structure, and are progressively rotated and stacked. The first plurality of beamforming layers can be substantially similar to the first plurality of beamforming layers 310 and can include a plurality of beamforming interface elements symmetrically disposed proximate to a perimeter of the beamforming layer, wherein the plurality of beamforming interface elements form beamforming inputs, beamforming outputs, and beamforming vias that pass through the beamforming layer. The method 400, at block 404, includes providing a beam routing layer on the first plurality of beamforming layers, wherein the beam routing layer includes signal interconnects that correspond to and communicate with the plurality of symmetric interface elements on an adjacent beamforming layer. The beam routing layer can be substantially similar to the beam routing layer 320 and is to route and distribute beamforming inputs from an input side of the beam routing layer to corresponding signal interconnects on an output side of the beam routing layer. The method 400, at block 406, includes providing a second plurality of beamforming layers on the beam routing layer to sandwich the beam routing layer between the first plurality of beamforming layers. The second plurality of beamforming layers, wherein each of the beamforming layers are axially symmetric, has an identical structure, and are progressively rotated and stacked. The second plurality of beamforming layers can be substantially similar to the second plurality of beamforming layers 330 and have an identical structure as the first plurality of beamforming layers.

Figure 5:
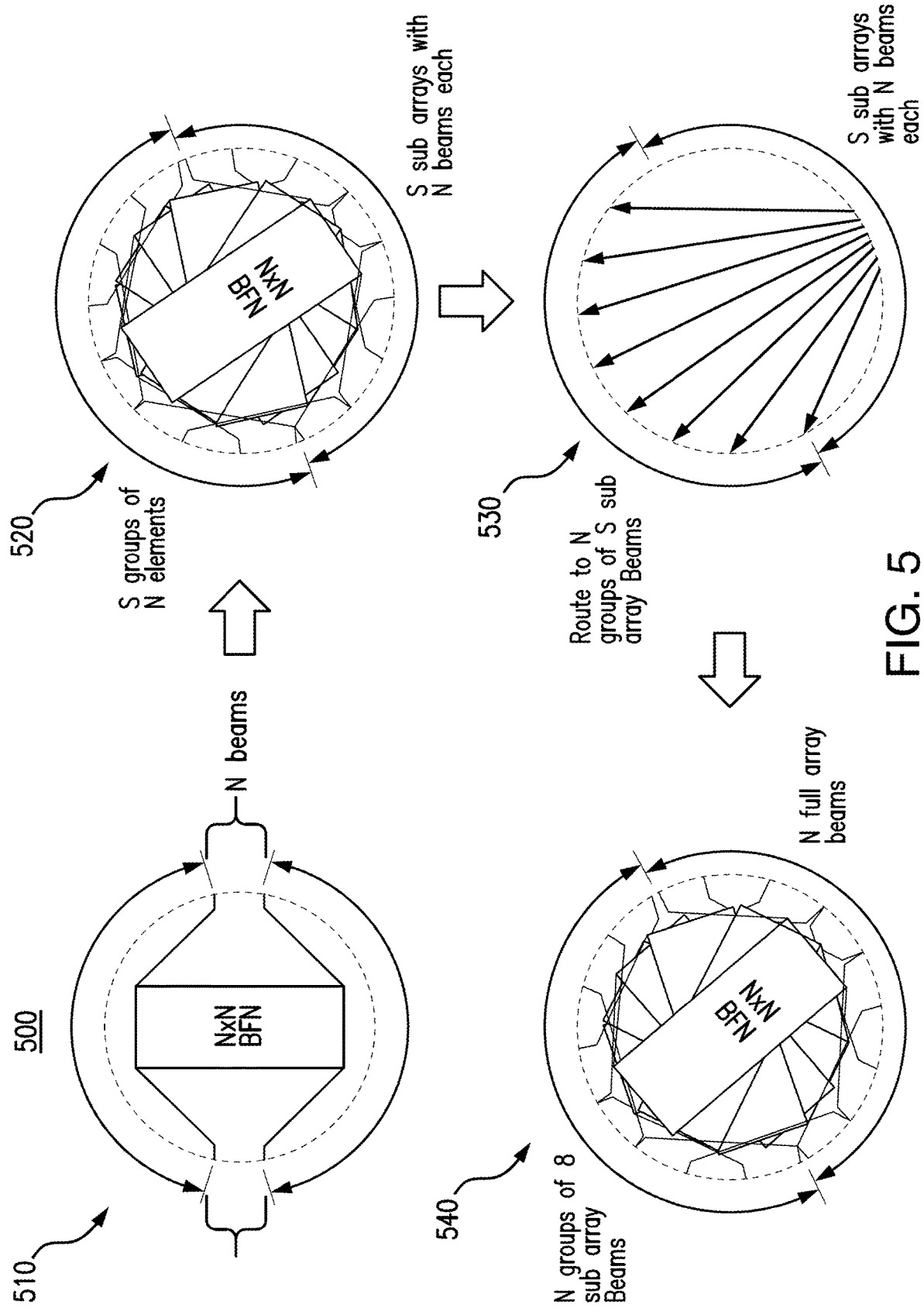
FIG. 5 illustrates a method of fabricating the axially symmetric beamforming assembly according to an example.

Turning now to FIG. 5, a method for fabricating a high-density beamforming structure, in accordance with one or more examples, is shown. Method 500 illustrates the steps for fabricating high-density beamforming structure, such as the high-density beamforming assembly 300 discussed above with respect to FIGS. 3A-3B, and includes components that are substantially similar to the components discussed herein with respect to FIGS. 1-4. Method 500, at step 510 includes providing a first plurality of axially symmetric beamforming structures, wherein each beamforming structure includes a plurality of beamforming inputs, a beamforming circuit, a plurality of beamforming outputs, and a plurality of pass through vias that form one or more beamforming sub-arrays. The axially symmetric beamforming structures can be substantially similar to beamforming layer(s) 100, 310 discussed above with respect to FIGS. 1-4. Method 500, at step 520, includes successively stacking and incrementally rotating each of the plurality of axially symmetric beamforming structures to form a first high-density beamforming stack, wherein the high-density beamforming stack forms a beamforming array group. Method 500, at step 530, includes disposing a beam routing layer on the first high-density beamforming stack, wherein the beam routing layer includes a plurality of signal interconnects that correspond to and communicate with one or more of the plurality of beamforming structures on an adjacent beamforming layer, and wherein the beam routing layer is to route and distribute the beamforming inputs from an input side of the beam routing layer to a plurality of signal interconnects on an output side of the beam routing layer. The beam routing layer can be substantially similar to beam routing layer 200, 320 discussed above with respect to FIGS. 1-4. Method 500, at step 540, includes providing a second plurality of axially symmetric beamforming structures to form a second high-density beamforming stack, wherein the second high-density beamforming stack has an identical architecture as the first high-density beamforming stack; and, sandwiching the beam routing layer between the first high-density beamforming stack and the second high-density beamforming stack to provide expanded beamforming array. The resulting assembly can be substantially similar to the high-density beamforming assembly 300.

In one or more examples, the first plurality of beamforming layers and the second plurality of beamforming layers can include various beamforming structures including, for example, a printed wiring board and digital beamforming electronics to control the plurality of full array beams. In one or more examples, the first plurality of beamforming layers and the second plurality of beamforming layers can also include an interposer and a wafer scale beamformer to control the plurality of full array beams. In one or more further examples, the first plurality of beamforming layers and the second plurality of beamforming layers can include an optical waveguide layer and a photonic integrated circuit beamforming network to control the plurality of full array. In examples, the optical waveguide layer further includes holes and micro mirrors to edge couple input optical signals with the photonic integrated circuit beamforming network.

FIGS. 6-8 illustrate alternative beamforming layers in accordance with one or more examples. FIG. 6 illustrates a beamforming layer 600. FIG. 7 illustrates a beamforming layer 700. FIG. 8 illustrates a beamforming layer 800. Each of beamforming layers 600, 700 and 800 are substantially similar to the beamforming layers disclosed with respect to FIGS. 1-5 and can be readily substituted therefor. Beamforming layer 600 includes a printed wiring board (PWB) 610 and digital beamforming electronics 620. The PWB 610 includes pass through vias 612a on an input side and pass through via 612b on an output side. The PWB 610 also includes N element inputs 614a on a bottom of the input side and N element outputs 614b on a top of the output side. N element inputs 614a connect to the digital beamforming electronics 620 via input side signal trace 616a. The digital beamforming electronics 620 also connects to N element outputs 614b via output side signal trace 616b to direct processed signals to an output side of the beamforming layer 600. The N element inputs 614a, input side signal trace 616a, digital beamforming electronics 620, output side signal trace 616b, and N element outputs 614b form a beamforming pathway for a signal from an input side to an output side of the PWB 610. The N element inputs 614a and N element outputs 614b can provide RF connectors. The pass through via 612a, 612b allows signals to pass from a bottom to a top of the interposer, and thereby between beamforming layers 600 when stacked.

FIG. 7 illustrates a beamforming layer 700. Beamforming layer 700 includes an interposer 710 and wafer scale beamformer 720. The interposer 710 includes pass through vias 712a on an input side and pass through via 712b on an output side. The interposer 710 also includes solder ball 714a attached on a bottom of the input side and solder ball 712b attached on a bottom of the output side. Solder ball 714a connects an input to the wafer scale beamformer 720 via input side signal trace 716a. The wafer scale beamformer 720 also connects to an output side of the interposer 710 via output side signal trace 716b to direct processed signals to an output of the beamforming layer 700. The solder ball 714a, input side signal trace 716a, wafer scale beamformer 720, and output side signal trace 716b form a beamforming pathway for a signal from an input side to an output side of the interposer 710. When a plurality of interposers 710 are stacked, the solder balls 714a, 712a, and 712b provide connection(s) and pathway(s) between an adjacent interposer 710. The pass through vias 712a, 712b allow signals to pass from a bottom to a top of the interposer 710, and thereby between adjacent beamforming layers when stacked.

FIG. 8 illustrates a beamforming layer 800 and represents a photonic example. Beamforming layer 800 includes a PWB 810, an optical waveguide layer 812, and a photonic integrated circuit beamforming network 820. The optical waveguide layer 812 includes pass through via 814a on an input side and pass through vias 814b on an output side. The pass through via 814a, 814b allows signals to pass from a bottom to a top of the optical waveguide layer 812, and thereby between adjacent beamforming layers 800 when stacked. The optical waveguide layer 812 also includes an optical signal input channel 822a and an optical signal output channel 822b. Input side mirrors 824a disposed inside the optical signal input channel 822a form an optical waveguide to guide the input optical signal to the photonic integrated circuit beamforming network 820, and output side mirrors 824b disposed inside the optical signal output channel 822b form an optical waveguide to guide processed output optical signals to an output of the beamforming layer 800. In examples, the mirrors 824a, 824b are micro mirrors that edge couple input optical signals with the photonic integrated circuit beamforming network 820.

ADDITIONAL NOTES AND EXAMPLES

Example 1 includes a high-density beamforming assembly for phased array antennas, the assembly comprising: a first plurality of beamforming layers, wherein each beamforming layer has an identical structure and includes: a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and, a beamforming circuit disposed on the beamforming layer, wherein the beamforming circuit is in communication with one or more of the n-beamforming inputs and one or more of the n-beamforming outputs to form a beamforming sub-array, and wherein the first plurality of beamforming layers are to be axially symmetric, progressively rotated and stacked such that the plurality of beamforming interface elements correspond to and communicate with a plurality of beamforming interface elements on an adjacent beamforming layer to form a plurality of beamforming sub-array groups; and, a beam routing layer disposed on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

Example 2 can include the high-density beamforming assembly of Example 1, further having a second plurality of beamforming layers disposed on the beam routing layer to sandwich the beam routing layer between the first plurality of beamforming layers, wherein the second plurality of beamforming layers have an identical structure as the first plurality of beamforming layers.

Example 3 can include the high-density beamforming assembly of Example 2, wherein each of the second plurality of beamforming layers are to be axially symmetric and stacked with respect to another of the second plurality of beamforming layers such that the x-beamforming vias correspond to and communicate with x-beamforming vias of an adjacent layer.

Example 4 can include the high-density beamforming assembly according to any of Examples 2 to 3, wherein each of the first plurality of beamforming layers and each of the second plurality of beamforming layers includes a printed wiring board, and wherein the beamforming circuit includes digital beamforming electronics to control n-full array beams.

Example 5 can include the high-density beamforming assembly according to any of Examples 2 to 3, wherein each of the first plurality of beamforming layers and each of the second plurality of beamforming layers includes an interposer, and wherein the beamforming circuit includes a wafer scale beamformer to control n-full array beams.

Example 6 can include the high-density beamforming assembly according to any of Examples 2 to 3, wherein each of the first plurality of beamforming layers and each of the second plurality of beamforming layers includes an optical waveguide layer, and wherein the beamforming circuit includes a photonic integrated circuit beamforming network to control n-full array beams.

Example 7 can include the high-density beamforming assembly of Example 6, wherein the optical waveguide layer further includes holes and micro mirrors to edge couple input optical signals with the photonic integrated circuit beamforming network.

Example 8 includes a high-density beamforming method for phased array antennas, the method comprising: providing a first plurality of beamforming layers, wherein each beamforming layer has an identical structure and includes: a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and, a beamforming circuit disposed on the beamforming layer, wherein the beamforming circuit is in communication with the n-beamforming inputs and the n-beamforming outputs to form a beamforming sub-array, and wherein the first plurality of beamforming layers are to be axially symmetric, progressively rotated and stacked such that the plurality of beamforming interface elements correspond and communicate with respect to a plurality of beamforming interface elements on an adjacent beamforming layer to form a plurality of beamforming sub-array groups; and, providing a beam routing layer on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

Example 9 can include the high-density beamforming method of Example 8, further having providing a second plurality of beamforming layers on the beam routing layer to sandwich the beam routing layer between the first plurality of beamforming layers, wherein the second plurality of beamforming layers have an identical structure as the first plurality of beamforming layers.

Example 10 can include the high-density beamforming method of Example 8, wherein each of the second plurality of beamforming layers are to be axially symmetric and stacked with respect to another of the second plurality of beamforming layers such that the x-beamforming vias correspond to and communicate with x-beamforming vias of an adjacent layer.

Example 11 can include the high-density beamforming method according to any of Examples 9 to 10, wherein each of the first plurality of beamforming layers and each of the second plurality of beamforming layers includes a printed wiring board, and wherein the beamforming circuit includes digital beamforming electronics to control n-full array beams.

Example 12 can include the high-density beamforming method according to any of Examples 9 to 10, wherein each of the first plurality of beamforming layers and each of the second plurality of beamforming layers includes an interposer, and wherein the beamforming circuit includes a wafer scale beamformer to control n-full array beams.

Example 13 can include the high-density beamforming method according to any of Examples 9 to 10, wherein each of the first plurality of beamforming layers includes an optical waveguide layer, and wherein the beamforming circuit includes a photonic integrated circuit beamforming network to control n-full array beams.

Example 14 can include the high-density beamforming method of Example 13, wherein the optical waveguide layer further includes holes and micro mirrors to edge couple input optical signals with the photonic integrated circuit beamforming network.

Example 15 includes a method for fabricating a high-density beamforming structure, the method comprising: providing a first plurality of axially symmetric beamforming structures, wherein each beamforming structure includes a plurality of beamforming inputs, a beamforming circuit, a plurality of beamforming outputs, and a plurality of pass through vias that form one or more beamforming sub-arrays; successively stacking and incrementally rotating each of the plurality of axially symmetric beamforming structures to form a first high-density beamforming stack, wherein the high-density beamforming stack forms a beamforming array group; and, disposing a beam routing layer on the first high-density beamforming stack, wherein the beam routing layer includes a plurality of signal interconnects that correspond to and communicate with one or more of the plurality of beamforming structures on an adjacent beamforming layer, and wherein the beam routing layer is to route and distribute the beamforming inputs from an input side of the beam routing layer to a plurality of signal interconnects on an output side of the beam routing layer.

Example 16 can include the method of Example 15, further having providing a second plurality of axially symmetric beamforming structures to form a second high-density beamforming stack, wherein the second high-density beamforming stack has an identical architecture as the first high-density beamforming stack; and, sandwiching the plurality of beam routing layers between the first high-density beamforming stack and the second high-density beamforming stack to provide expanded beamforming arrays.

Example 17 can include the method according to any of Examples 16 to 17, wherein each of the first plurality of axially symmetric beamforming structures and each of the second plurality of axially symmetric beamforming structures includes a printed wiring board and digital beamforming electronics to control a plurality of full array beams.

Example 18 can include the method according to any of Examples 16 to 17, wherein each of the first plurality of axially symmetric beamforming structures and each of the second plurality of beamforming structures includes an interposer and a wafer scale beamformer to control a plurality of full array beams.

Example 19 can include the method according to any of Examples 16 to 17, wherein each of the first plurality of axially symmetric beamforming structures and each of the second plurality of beamforming structures includes an optical waveguide layer and a photonic integrated circuit beamforming network to control a plurality of full array beams.

Example 20 can include the method of Example 19, wherein the optical waveguide layer further includes holes and micro mirrors to edge couple input optical signals with the photonic integrated circuit beamforming network.

The terms "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first", "second", "third", etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the examples of the present disclosure can be implemented in a variety of forms. Therefore, while the examples of this invention have been described in connection with particular examples thereof, the true scope of the examples of the invention should not be so limited since other modifications will become apparent to the skilled practitioner upon a study of the drawings, specification, and following claims.

We claim:

1. A high-density beamforming assembly for phased array antennas, the assembly comprising:
   a first plurality of beamforming layers, wherein each beamforming layer has an identical structure and includes:
      a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and,
      a beamforming circuit disposed on the beamforming layer, wherein the beamforming circuit is in communication with one or more of the n-beamforming inputs and one or more of the n-beamforming outputs to form a beamforming sub-array, and wherein the first plurality of beamforming layers are to be axially symmetric, progressively rotated and stacked such that the plurality of beamforming interface elements correspond to and communicate with a plurality of beamforming interface elements on an adjacent beamforming layer to form a plurality of beamforming sub-array groups; and,
   a beam routing layer disposed on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

2. The high-density beamforming assembly of claim 1, further comprising a second plurality of beamforming layers disposed on the beam routing layer to sandwich the beam routing layer between the first plurality of beamforming layers, wherein the second plurality of beamforming layers have an identical structure as the first plurality of beamforming layers.

3. The high-density beamforming assembly of claim 2, wherein each of the second plurality of beamforming layers are to be axially symmetric and stacked with respect to another of the second plurality of beamforming layers such that the plurality of beamforming interface elements correspond to and communicate with a plurality of beamforming interface elements of an adjacent layer.

4. The high-density beamforming assembly of claim 3, wherein each of the first plurality of beamforming layers and each of the second plurality of beamforming layers includes a printed wiring board, and wherein the beamforming circuit includes digital beamforming electronics to control n-full array beams.

5. The high-density beamforming assembly of claim 3, wherein each of the first plurality of beamforming layers and each of the second plurality of beamforming layers includes an interposer, and wherein the beamforming circuit includes a wafer scale beamformer to control n-full array beams.

6. The high-density beamforming assembly of claim 3, wherein each of the first plurality of beamforming layers and each of the second plurality of beamforming layers includes an optical waveguide layer, and wherein the beamforming circuit includes a photonic integrated circuit beamforming network to control n-full array beams.

7. The high-density beamforming assembly of claim 6, wherein the optical waveguide layer further includes holes and micro mirrors to edge couple input optical signals with the photonic integrated circuit beamforming network.

8. A high-density beamforming method for phased array antennas, the method comprising:
   providing a first plurality of beamforming layers, wherein each beamforming layer has an identical structure and includes:
      a plurality of beamforming interface elements symmetrically disposed proximate to a perimeter of the beamforming layer, wherein the plurality of beamforming interface elements form n-beamforming inputs, n-beamforming outputs, and x-beamforming vias that pass through the beamforming layer; and,
      a beamforming circuit disposed on the beamforming layer, wherein the beamforming circuit is in communication with the n-beamforming inputs and the n-beamforming outputs to form a beamforming sub-array, and wherein the first plurality of beamforming layers are to be axially symmetric, progressively rotated and stacked such that the plurality of beamforming interface elements correspond and communicate with respect to a plurality of beamforming interface elements on an adjacent beamforming layer to form a plurality of beamforming sub-array groups; and,
   providing a beam routing layer on the first plurality of beamforming layers, wherein the beam routing layer includes x-signal interconnects that correspond to and communicate with the plurality of beamforming interface elements on an adjacent beamforming layer, and wherein the beam routing layer is to route and distribute each of the n-beamforming inputs from an input side of the beam routing layer to corresponding x-signal interconnects on an output side of the beam routing layer.

9. The high-density beamforming method of claim 8, further comprising providing a second plurality of beamforming layers on the beam routing layer to sandwich the beam routing layer between the first plurality of beamforming layers, wherein the second plurality of beamforming layers have an identical structure as the first plurality of beamforming layers.

10. The high-density beamforming method of claim 9, wherein each of the second plurality of beamforming layers are to be axially symmetric and stacked with respect to another of the second plurality of beamforming layers such that the x-beamforming vias correspond to and communicate with x-beamforming vias of an adjacent layer.

11. The high-density beamforming method of claim 9, wherein each of the first plurality of beamforming layers and each of the second plurality of beamforming layers includes a printed wiring board, and wherein the beamforming circuit includes digital beamforming electronics to control n-full array beams.

12. The high-density beamforming method of claim 9, wherein each of the first plurality of beamforming layers and each of the second plurality of beamforming layers includes an interposer, and wherein the beamforming circuit includes a wafer scale beamformer to control n-full array beams.

13. The high-density beamforming method of claim 9, wherein each of the first plurality of beamforming layers and each of the second plurality of beamforming layers includes an optical waveguide layer, and wherein the beamforming circuit includes a photonic integrated circuit beamforming network to control n-full array beams.

14. The high-density beamforming method of claim 13, wherein the optical waveguide layer further includes holes and micro mirrors to edge couple input optical signals with the photonic integrated circuit beamforming network.

15. A method for fabricating a high-density beamforming structure, the method comprising:
providing a first plurality of axially symmetric beamforming structures, wherein each beamforming structure includes a plurality of beamforming inputs, a beamforming circuit, a plurality of beamforming outputs, and a plurality of pass through vias that form one or more beamforming sub-arrays;
successively stacking and incrementally rotating each of the plurality of axially symmetric beamforming structures to form a first high-density beamforming stack, wherein the high-density beamforming stack forms a beamforming array group; and,
disposing a beam routing layer on the first high-density beamforming stack, wherein the beam routing layer includes a plurality of signal interconnects that correspond to and communicate with one or more of the plurality of beamforming structures on an adjacent beamforming layer, and wherein the beam routing layer is to route and distribute the beamforming inputs from an input side of the beam routing layer to a plurality of signal interconnects on an output side of the beam routing layer.

16. The method of claim 15, further comprising:
providing a second plurality of axially symmetric beamforming structures to form a second high-density beamforming stack, wherein the second high-density beamforming stack has an identical architecture as the first high-density beamforming stack; and,
sandwiching the beam routing layer between the first high-density beamforming stack and the second high-density beamforming stack to provide expanded beamforming arrays.

17. The method of claim 16, wherein each of the first plurality of axially symmetric beamforming structures and each of the second plurality of axially symmetric beamforming structures includes a printed wiring board and digital beamforming electronics to control a plurality of full array beams.

18. The method of claim 16, wherein each of the first plurality of axially symmetric beamforming structures and the second plurality of axially symmetric structures includes an interposer and a wafer scale beamformer to control a plurality of full array beams.

19. The method of claim 15, wherein each of the first plurality of axially symmetric beamforming structures and the second plurality of axially symmetric structures includes an optical waveguide layer and a photonic integrated circuit beamforming network to control a plurality of full array beams.

20. The method of claim 19, wherein the optical waveguide layer further includes holes and micro mirrors to edge couple input optical signals with the photonic integrated circuit beamforming network.

\* \* \* \* \*